United States Patent
Suarez-Valdes Suarez (10) Patent No.: US 10,738,931 B2
(45) Date of Patent: Aug. 11, 2020

(54) ENCASEMENT FOR HEAT TRANSFER FLUID (HTF) CONDUITS

(75) Inventor: José Guillemo Suarez-Valdes Suarez, Carreño (ES)

(73) Assignee: AISLAMIENTOS SUAVAL, S.A., Carreno, Asturias (ES)

( * ) Notice: Subject to any disclaimer, the term of this patent is extended or adjusted under 35 U.S.C. 154(b) by 428 days.

(21) Appl. No.: 13/408,711

(22) Filed: Feb. 29, 2012

(65) Prior Publication Data

US 2013/0008637 A1    Jan. 10, 2013

(30) Foreign Application Priority Data

Jul. 8, 2011    (ES) .................................. 201131163

(51) Int. Cl.
*F16L 59/21* (2006.01)
*F16L 59/18* (2006.01)

(52) U.S. Cl.
CPC ............. *F16L 59/21* (2013.01); *F16L 59/185* (2013.01)

(58) Field of Classification Search
CPC .................................. F16L 59/21; F16L 59/185
USPC ......... 285/47, 147.1, 187, 381.1, 41, 45, 55, 285/905
See application file for complete search history.

(56) References Cited

U.S. PATENT DOCUMENTS

| | | | | |
|---|---|---|---|---|
| 1,085,973 A | * | 2/1914 | Conkling | B65D 47/283 137/615 |
| 3,559,694 A | * | 2/1971 | Volberg | F16L 59/16 138/147 |
| 3,857,590 A | * | 12/1974 | Meeker | 285/305 |
| 4,598,427 A | * | 7/1986 | Vykukal | A62B 17/001 138/120 |
| 4,598,428 A | * | 7/1986 | Vykukal | A62B 17/001 138/120 |

\* cited by examiner

*Primary Examiner* — Anna M Momper
*Assistant Examiner* — Fannie C Kee
(74) *Attorney, Agent, or Firm* — Lucas & Mercanti, LLP (57) ABSTRACT

An encasement for heat transfer fluid (HTF) conduits having an outer layer (1) of sheet metal and an intermediate layer (2) below the outer layer (1). The intermediate layer (2) is made of insulating material having a maximum thickness of 1.4 inches (35 mm). The heat transfer fluid (HTF) conduits are movable.

14 Claims, 12 Drawing Sheets

ENCASEMENT FOR HEAT TRANSFER FLUID (HTF) CONDUITS

This application claims benefit of Serial No. 201131163, filed 8 Jul. 2011 in Spain and which application is incorporated herein by reference. To the extent appropriate, a claim of priority is made to the above disclosed application.

FIELD OF THE INVENTION

The invention relates to an insulation and encasement system for movable heat transfer fluid conduits.

BACKGROUND OF THE INVENTION

Removable mat-based insulations made up of the following materials are known:
1. A glass fiber fabric with a stainless steel foil or sheet on its outer face as the encasement of the inner face.
2. A 1 inch (25 mm) thick ceramic fiber insulation layer with a density of 8 lb/ft$^3$ (128 kg/m$^3$) as inner insulation.
3. A glass fiber fabric coated with silicone or Teflon as the encasement of the outer face (depending on the engineering).
4. These mats were sewn at all their ends by a glass fiber wire resistant to high temperatures.

Theoretically, these specified mats met some of the requirements that were specified, and they did not meet others but it was considered the only solution. These requirements were the following:

A. In the event of a thermal oil leak in the attachments between pipe segments in the swivel arms, which were already provided for, the oil could not impregnate the insulation whereby the outer face of the encasement of the inner face of the mat could not let the oil pass through to the mats covering the three joints of each arm. This was achieved with the glass fiber fabric with the stainless foil because the stainless acted as a barrier for the oil.

B. The insulation in the rotating joints had to be easily removable for frequent required maintenance to graphitize the rotating joints. This was achieved by making independent mats for the rotating joints.

C. The outer encasement of the mat had to be impermeable to prevent the insulation from getting wet because this would cancel out the insulating effect and would furthermore progressively deteriorate it. This was achieved with the silicon or Teflon fabric.

D. The arm had to be perfectly insulated and, like the rest of the pipes, had to have minimal heat losses. This was not achieved because the 25 mm layer of ceramic fiber achieves only a 23-29% insulating power with respect to the 100 mm thick mat of 100 kg/m$^3$, which is the material and thickness used for insulating pipes up to 3" in diameter conducting heat transfer fluid in the solar field because the lambda values thereof at 400° C. are very similar. Thicker ceramic fiber could not be installed because the pipe of the arms is 2" or 2.5" in diameter and it is impossible to manufacture mats for the elbows and for the ball joints such that they correctly close and absorb, without leaving ball joints, the movements of the arm. It was considered that there was not a better solution and the mats were installed.

E. The insulation-encasement system installed had to absorb the movements of the swivel arm, in all its directions, without causing the insulation to slide, the encasement to deteriorate and, accordingly, without forming rotating joints through which heat losses occur and water can enter. Since the mats are installed in new condition, they meet this requirement, but experience in several plants has demonstrated that since they are mats which are tied with wire or with glass fiber fabric strips, with the continuous arm movement and the action of atmospheric agents, sliding takes place and rotating joints are formed, all of which completely deteriorate the quality of the insulation.

After about 7-12 months of the mats being installed in the Spanish plants, several problems were detected and, when communicating with the American plants, it was corroborated that new problems had arisen that were not foreseen during the design stage and that the mats furthermore did not meet these requirements. These problems were the following:

F. The ray of sunlight reflected by the mirrors on the pipe is reflected not only frontally towards the pipe conducting the heat transfer fluid but it is also reflected laterally, and depending on the time of day or season of the year, there are concentrations of solar radiation on the mats of up to 80 kW/m$^2$. This means that the silicone or Teflon is withstood at very high temperatures, the engineering firms estimate that between 350° and 450°, and after 140-180°, at the most, these materials disintegrate causing the glass fiber, which allows the entrance of water, to gradually wizen and the mats open up and end up breaking and falling.

G. In two of the Spanish plants, there were heat transfer fluid leaks in rotating joints, leading to ignition and causing considerable fires in the area of the rotating joint. After investigating the causes of this ignition, when the insulating materials and the stainless foil are fire-resistant, it was concluded that it was because the thermal oil at 400° under the pressure at which the fluid is conducted and in contact with oxygen can cause ignition if that pressure is contained within the mat and does not find an escape route. With the mats this pressure has no escape route, so the risk of ignition of the heat transfer fluid is highly probable. The fires occurring in the Spanish plants in the rotating joints were one of the biggest engineering problems because the environmental hazard is very considerable if the fire spreads.

H. The swivel arms are supported in most engineering designs by frames with rotating tubes acting as bearings so that the arms move through those bearings. Since the ceramic fiber-insulated mats lack rigidity, they gradually crush the insulating material, breaking it and moving it to the sides, whereby finally the area of the mats moving through the supports virtually ends up with no insulation with the subsequent losses.

The mats have been deteriorating little by little in all the facilities and a patch has been made in most consisting of deflecting collars placed above the mats and preventing the solar concentration thereon. This solution has two drawbacks, the first being that it makes the solution considerably more expensive, and the second being that these deflectors have a sail effect and distort the calculated movement of the mirrors, whereby being able to result in breakdowns in the rotating mechanisms.

SUMMARY OF THE INVENTION

The invention relates to a system solving all the problems indicated above by means of the following constructive solutions:

A. Need to prevent the passage of thermal oil to the insulation in the event of a leak in the rotating joint. The rotating joint is insulated by means of placing slots on the outer face and side faces of the aluminum sheet metal which internally contains the heat insulation, and the inner face of the insulation is covered with a glass fiber fabric with 2 inch (50 μm) stainless steel foil which prevents impregnation of the insulation in the event of a leak. The attachments of the fabric with the sheet metal are finished with a mastic resistant to 1832° F. (1,000° C.).

B. Need for the insulation of the rotating joints to be easily removable. The three rotating joints of each arm are insulated and encased by means of placing slots in aluminum made in two halves which are fitted to one another and closed with 4 clamp-like quick closures, whereby any unskilled operator can assemble and disassemble the box without any problem for maintenance tasks.

C. Need for the outer encasement of the mat to be impermeable to prevent the insulation from getting wet. With the solution of the present invention, all the insulation of the swivel arm has an encasement of aluminum sheet metal 0.02 and 0.06 inch (0.5 mm and 1.5 mm) thick and is impermeable to water.

D. Need for the heat losses occurring in the swivel arms to be equal or very close to that of the remaining pipes. All the straight segments, elbows and rotating ball joints are insulated with preformed segments of microporous isolation material, such as MICROTHERM® molded pipe section material, 25-35 mm thick. The microporous isolation material has an excellent lambda value and achieves the losses per linear meter of 2" (50.8 mm) pipe to be virtually the same. The heat losses occurring with ceramic fiber-insulated mats are reduced by more than 60% with this material.

E. Need for the installed insulation-encasement system to absorb the movements of the swivel arm in all its directions without the insulation sliding, the encasement deteriorating and accordingly there are no rotating joints causing heat losses and the entrance of water. In the solution developed in the present invention, rims 10-15 mm high are made in the final pipe segments, in the elbows, located with the rotating joint, on which rims the insulation boxes of the rotating joints themselves are assembled and supported. The insulation box of the rotating joint is therefore rendered "floating" or "rotating" because the side covers of this box are made with an exact measurement so that they cannot pass over the rims. At the ends of insulation of the pipe where it meets up with the rotating joint a cover is applied which is made either of 0.6 mm aluminum sheet metal or of glass fiber fabric with 50 μm stainless foil so that, in the event of an heat transfer fluid leak in the rotating joint, the oil does not pass on to the remaining pipe segments.

F. Need for the encasement material used in the rotating joint to withstand the temperatures reached with the solar concentration caused by the effect of the side reflection of the mirrors towards the swivel arms. With the solution of the present invention, since the entire coating of the insulation is based on aluminum sheet metal the possibility of deterioration of the encasement is eliminated because aluminum melts at 1112° F. (600° C.). This resistance is proven in the installed plants and it is also checked in insulation parts protecting parts arranged in the pipe of the mirrors and continue to be integral several years later.

G. Need to prevent the risk of ignition in the event of a heat transfer fluid leak in the rotating joints. With the rotating or floating encasement box for the rotating joints, the coating is never leak-tight, whereby in the event of a leak the released pressure will find an outlet along the perimeter of the box which at that time is open depending on the position of the arm at the time of the leak. The mats in all rotating joints become displaced by the arm movements and by the assembly and disassembly operations by the maintenance personnel; the consequence is that the mats often become interposed in the union joint of the pipe with the rotating joint and movement restrictions of the arms are generated which can derive in important damage to the pipes and the rotating joints.

H. Need to prevent insulation from deteriorating and creating large heat bridges caused by friction of the support of the swivel arm or by displacement of the mats. With the aluminum encasement of the present invention, the sheet metal withstands the friction, the movements and the blows caused by the change in inclination occurring in the supports. To give a coverage interval to the resistance of the sheet metal, the aluminum sheet metal segment sliding on the support is installed with a thickness of 0.06 inch (1.5 mm), thereby assuring the integrity of the insulation it protects. Given that the rotating joints are encased in aluminum boxes, the rotating joints are safe from a restriction in movement by an interference of the encasement.

Despite the fact that microporous isolation material is much more expensive than rock wool, the present invention has a lower cost than what the mats entailed because of the development of manufacturing and assembly processes with a high manufacturing and assembly standard.

In addition to all the solutions to the problems that have arisen in the operation of the swivel arms, the present invention also provides solutions to facilitate the installation of the encasement system.

The installation of the encasement of the invention is not technically complex and does not require being assembled by skilled insulation installers (heat insulation installers) so qualified heat insulation installers are not needed for installation or for de-installation, which results in a lower installation manual labor cost, and especially in the event of having to remove all the insulation of the swivel arm for maintenance or inspection tasks, the same operator who disassembles it can assemble it again without difficulty. With the solution of the present invention the encasement box of the rotating joints and the remaining insulation, straight segments, z-shaped segments and elbows, can be disassembled.

The installation of the invention has a very rapid assembly. This is because the segments are supplied with the insulating system preassembled therein, so the assembly time is very short. Prefabrication in a workshop can start at a very early phase of the project such that when the swivel arms are ready to be insulated, 100% of the encasements are prefabricated on site for installation. This milestone, in which the mechanical fitter supplies the arms to the insulation installer for insulation, is always uncertain because the pipes have to pass several pressure tests and treatments and problems often arise with the tests, which causes a delay in the construction job resulting in an overall lengthening of the project, because until the arms are insulated, the heat transfer fluid cannot be inserted in the heat circuit due to it being able to freeze if it drops below certain temperatures. Increasing stress is placed on reducing assembly times of all plant items.

These two features are a pending issue for traditional insulation systems because they always require a qualified assembly and disassembly and the work hours to be used in assembling them are always a bone of contention with project managers.

The present invention comprises an easy-to-assemble insulation kit for the swivel arms of the solar thermal plants.

The same base insulation and encasement materials are used in this kit as those used in the solution described above with microporous isolation material and aluminum sheet metal, but providing new and innovative pre-assembly and pre-mounting solutions which achieve the two advantages mentioned above:

- The kit can be assembled-disassembled by any general plant maintenance operator without having to be a skilled heat insulation installer and requiring no machinery (drills or riveters) for installation and de-installation, only a manual screw driver.
- The kit provides a 75% saving in assembly time in the on-site assembly, whereby improving the overall profitability of solar thermal plants. In the case of plants greater than 200 and 350MW, the savings can be very considerable.

The kit solution is achieved by pre-assembling all the insulation and encasement parts in a workshop, whereby the insulation will be supplied to the site incorporated in the encasement by means of applying adhesive with a microporous isolation material mastic or the like resistant to 1832° F. (1,000° C.).

The kit will be supplied on site in several parts, both the simple arm and the double arm. Three parts are always the encasement boxes of the rotating joints, whereas the rest are straight segments, z-shaped segments and elbows attached in several parts.

In all the parts, the insulation is incorporated in the encasement and the system is made up of two halves facing one another.

The encasement sheet metal segment ending against the rotating joints have the rim supporting the box of the rotating joint. All the remaining ends have a smaller rim for inter-segment assembly.

There are three types of elements for fixing and sealing the arms:

- A metal flange closing and sealing the two metal rims in which each segment ends.
- A rotating joint sealing all the longitudinal attachments resulting from the coupling between the two halves. This rotating joint has a lower layer of impermeable material such as Teflon, polyethylene or another impermeable material and with a heat resistance of about 392° F. (200° C.), and an aluminum cover protecting this impermeable layer from the solar concentration reflected by the mirrors on the arms.
- Metal flanges with screw locking which fix the entire system and secure the sealing joints.

BRIEF DESCRIPTION OF THE DRAWINGS

A series of drawings which aid in better understanding the invention and which expressly relate to an embodiment of said invention presented as a non-limiting example thereof is very briefly described below.

FIG. 1B1 shows a detail of the area of contact between a box and an elbow.

FIG. 1B2 shows a detail of the area of attachment between segments where the assembly rim is illustrated.

DETAILED DESCRIPTION OF AN EMBODIMENT

Figure 1A:
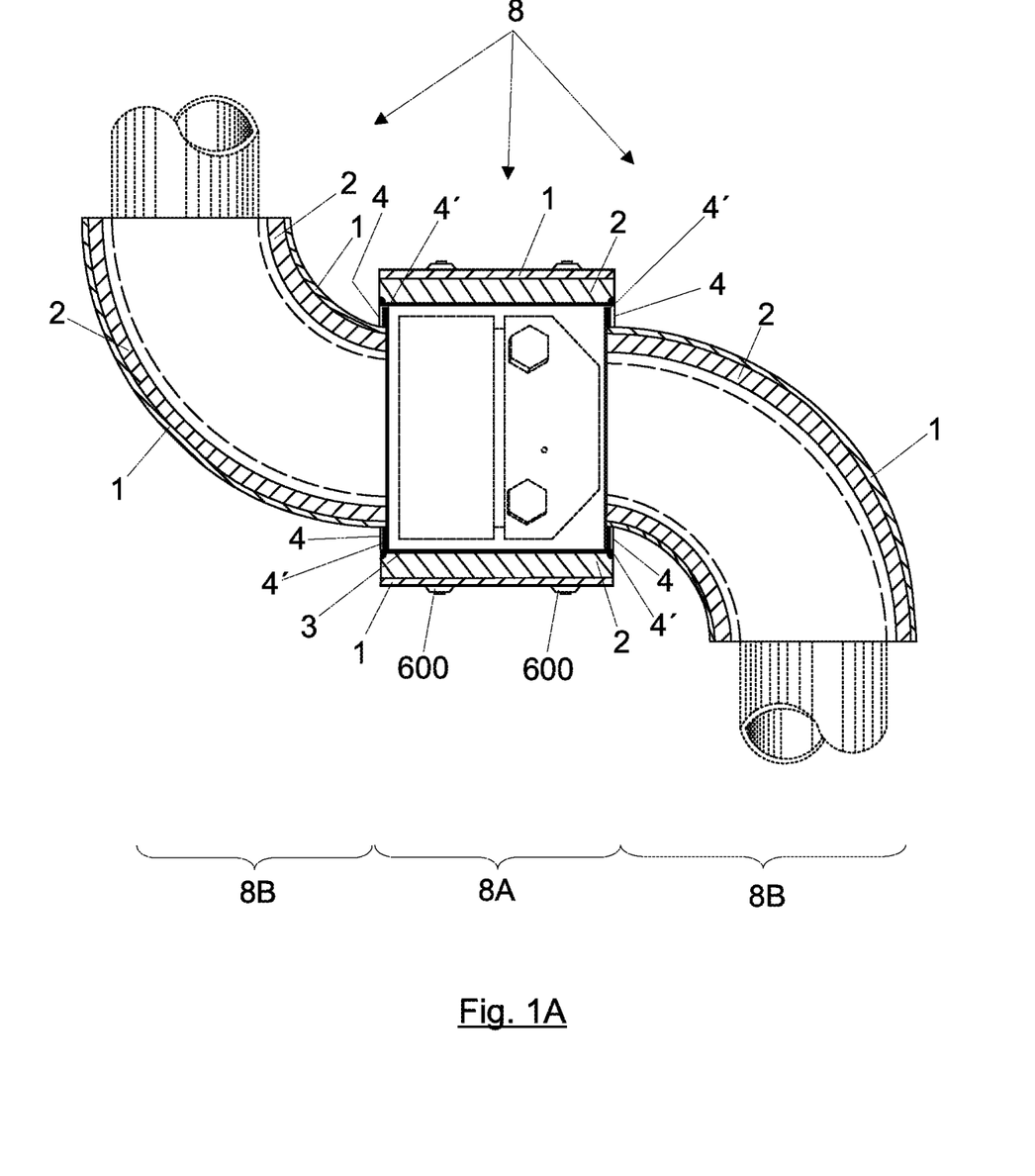
FIG. 1A shows an encasement of the invention.
Figure 1B:
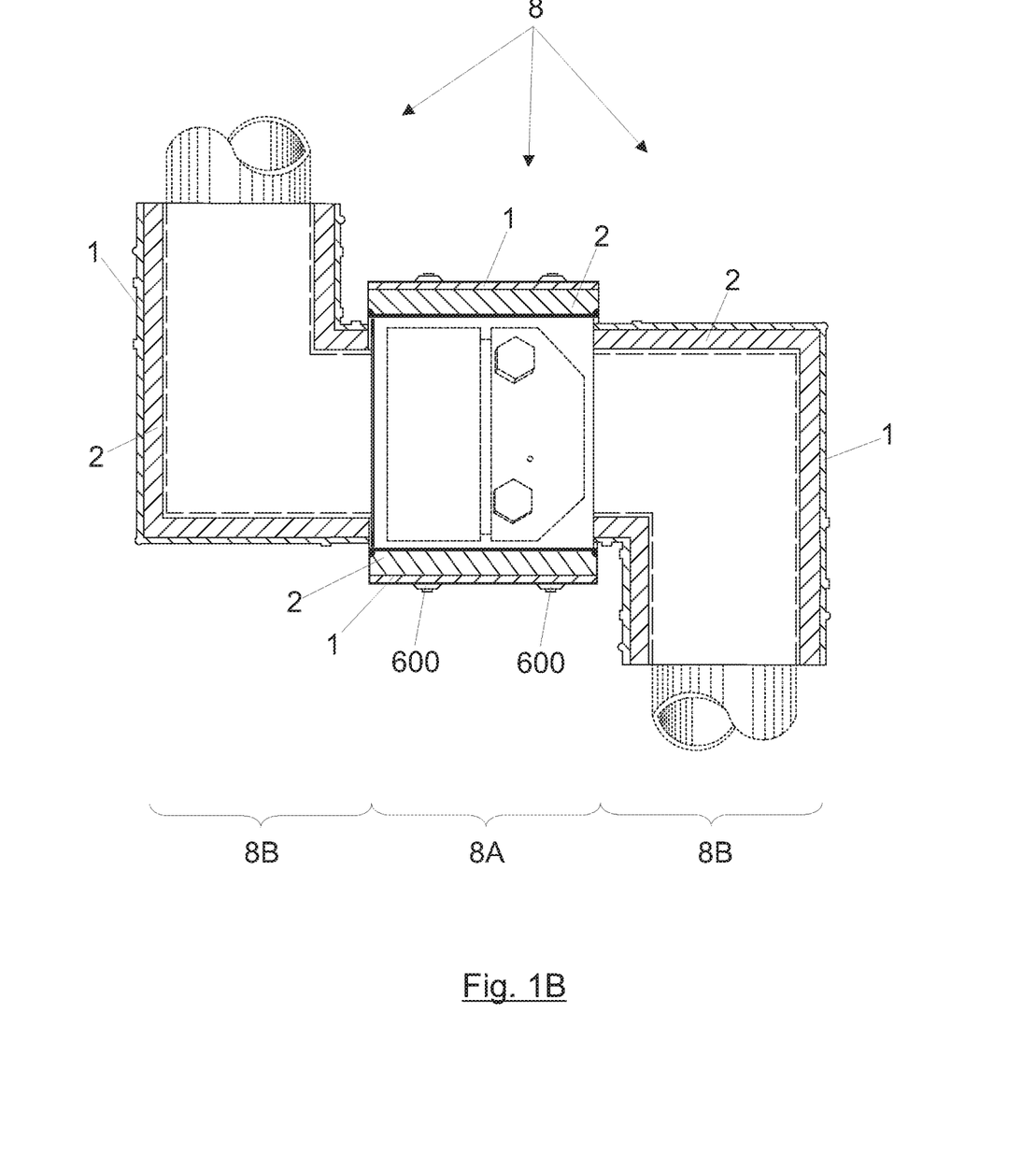
FIG. 1B shows an encasement of the invention in kit mode.

As illustrated in FIGS. 1A and 1B, an embodiment of the invention relates to an encasement for heat transfer fluid conduits:

comprising an outer layer (1) of sheet metal, encasement layer, configured to protect against working conditions such as high temperatures and high degree of sunshine;

comprising an intermediate layer (2), insulation layer below the outer layer (1)

of insulating material having a maximum thickness of 1.4 inch (35 mm);

wherein the heat transfer fluid conduits are movable.

According to other features of the invention:

The metal is aluminum.

The sheet metal has a thickness comprised between 0.02 and 0.06 inch (0.5 and 1.5 mm).

The insulating material is microporous.

The insulating material configured to heat-insulate has a heat transfer coefficient comprised between 0.11 and 0.33 BTU inch/(hr ft$^2$F) (0.016 and 0.048 W/mK) at 752° F. (400° C.) of the temperature of the heat transfer fluid (HTF).

The insulating material is molded pipe section shell.

As illustrated in FIGS. 1A and 1B, the encasement comprises an inner layer (3) comprising:

a glass fiber fabric (31) having a thickness comprised between (0.1 mm and 1.5 mm); 0.004 and 0.06 inch a sheet (32) made of corrosion resistant material, which can be stainless steel or aluminum, having a thickness comprised between 0.004 and 0.06 inch (0.1 mm and 1.5 mm).

As illustrated in FIG. 1B1, the encasement comprises:

As illustrated in FIGS. 1A and 1B, the encasement comprises a flange (4) having a height comprised between 10 and 15 mm configured to allow coupling between two consecutive segments 8 of the encasement.

Figure 1B:
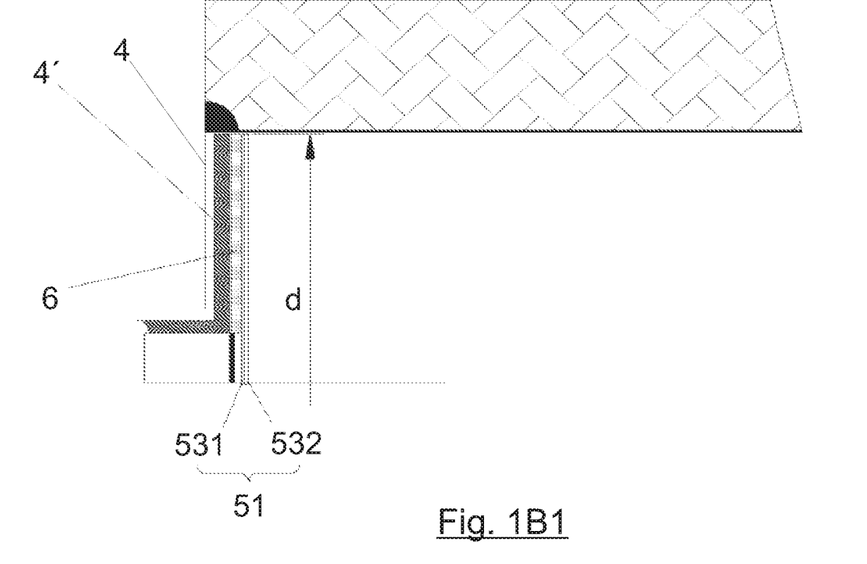

As illustrated in FIG. 1B1, the encasement comprises:

a cover (51, 531, 532) configured to close a front face of the encasement;

a ceramic fiber washer (6) between the cover (51, 531, 532) and the flange (4).

The cover (51, 531, 532) comprises 0.016 and 0.04 inch (0.4-1 mm) thick aluminum sheet metal (51), as illustrated in FIG. 1B1.

As illustrated in FIG. 1B1, the cover (51, 531, 532) comprises;

a glass fiber fabric (531) having a thickness comprised between 0.004 and 0.06 inch (0.1 and 1.5 mm); and a sheet (532) made of corrosion resistant material, which can be stainless steel or aluminum, having a thickness comprised between 0.04 inch and 0.4 inch (0.1 and 1.5 mm).

The encasement is box-shaped having a cylindrical inner cavity, as illustrated in FIG. 1B, having:
  a box diameter (D);
  a length (L);
  the box diameter (D) and the length (L) being configured to allow clearance between the box and the adjacent encasement segments 8. The clearance, which can be comprised between 1 and 10 mm, allows the box to have a floating arrangement on the adjacent encasement segments 8. Therefore, during the movement of the arms, the boxes can move over the elbows 8B, straight segments 8A or other segments of the encasement. Additionally, the clearances also allow variations in the dimensions of the components of the invention due to heat loads.

Figure 1B:
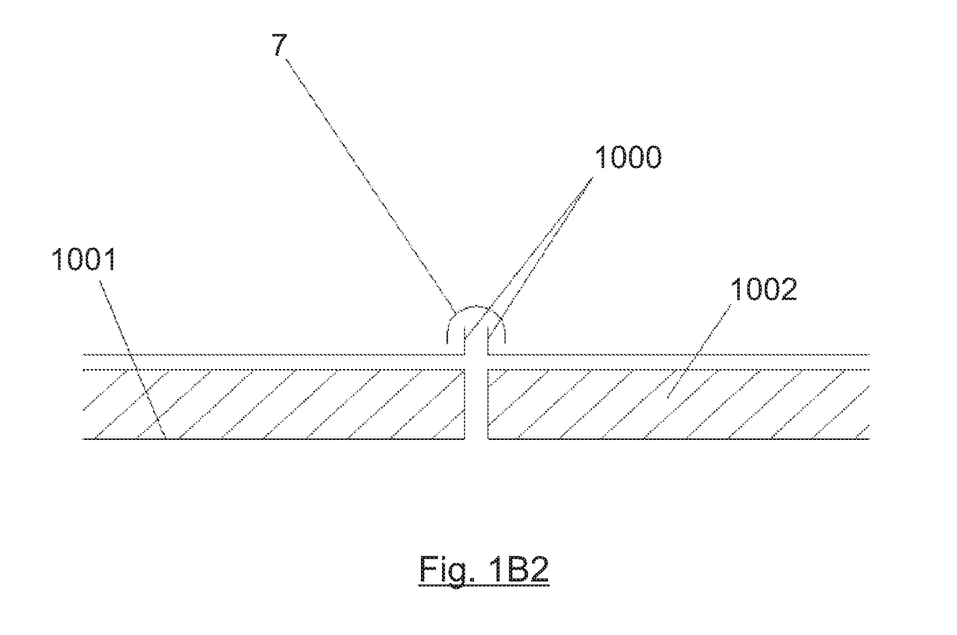
Figure 1C:
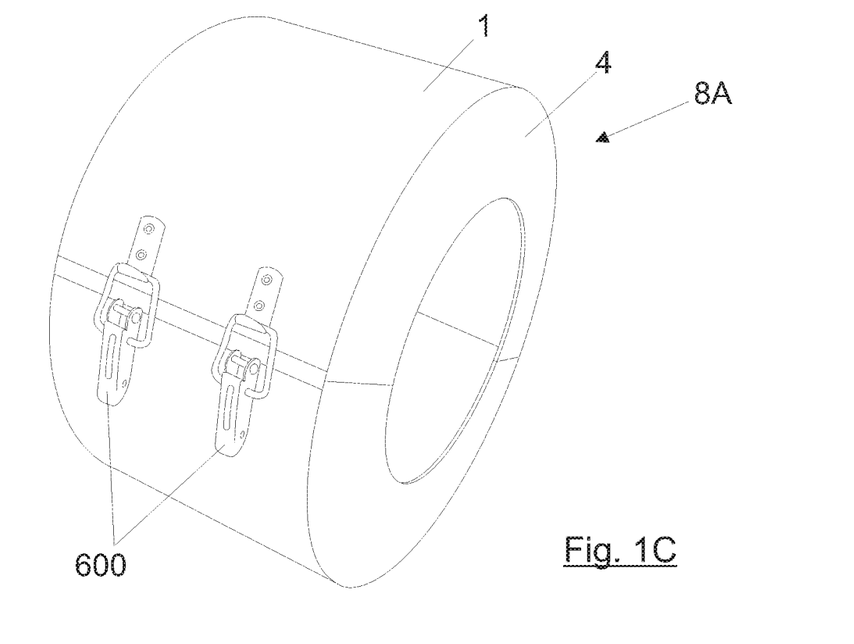
FIG. 1C shows a perspective view of an encasement in an open position in accordance with an embodiment.
Figure 1D:
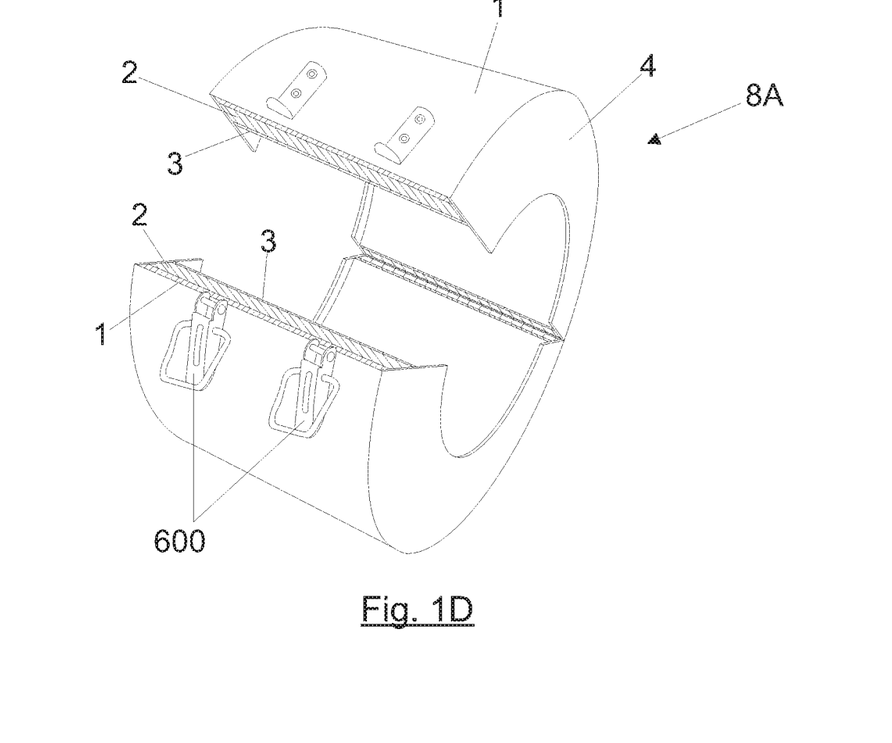
FIG. 1D shows a perspective view of an encasement in a closed position in accordance with an embodiment.

FIG. 1C shows a perspective view of encasement 8A in an open position in accordance with an embodiment. FIG. 1D shows a perspective view of encasement 8A in a closed position in accordance with an embodiment.

Figure 5A:
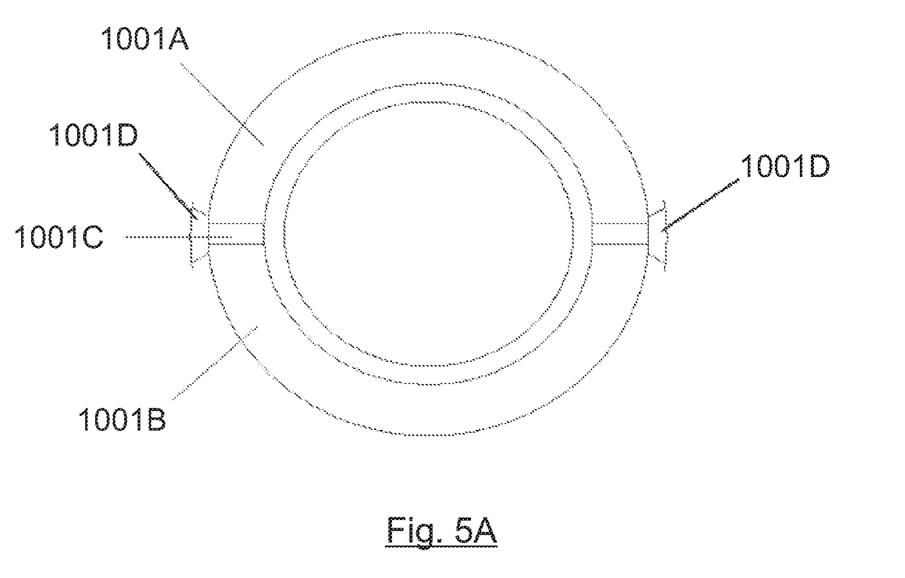
FIG. 5A is a cross-section showing two halves of an encasement, the longitudinal joint and a longitudinal flange.
Figure 5B:
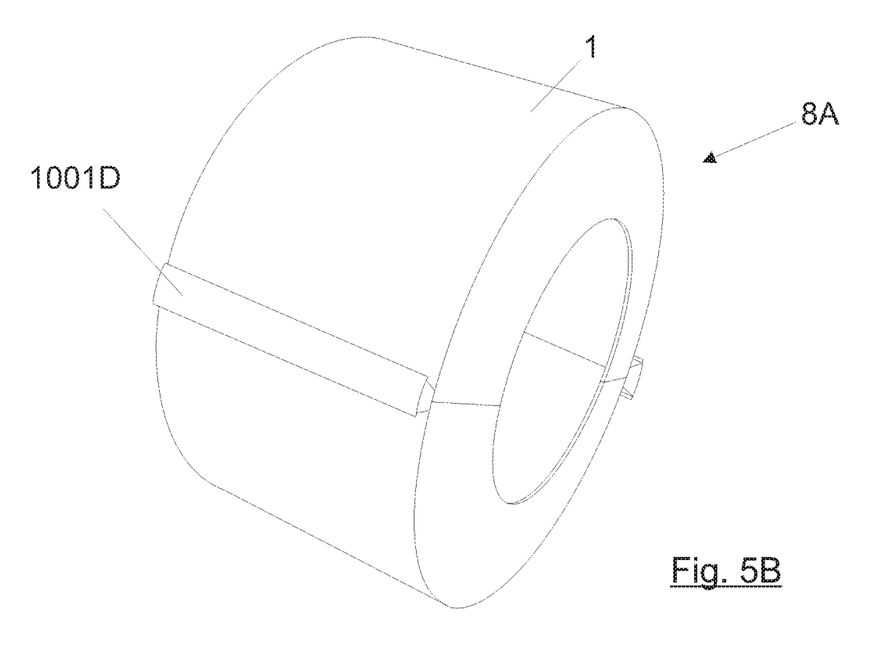
FIG. 5B is a perspective view of the encasement of the embodiment of FIG. 5A, showing a longitudinal metal flange 1001D.

As illustrated in FIG. 5, the encasement comprises two halves (1001A, 1001B) configured to envelope a conduit and to fit with one another.

According to a first embodiment of the invention, two steps are necessary for assembling the insulation and encasement system. In a first operation, the insulation layer or intermediate layer (2) is placed on the conduit, and then in a second operation, the encasement layer or outer layer (1) is placed on the insulation layer. These two layers are placed in the field, i.e., it is necessary to perform the two operations at the location of the facility of the conduits to be protected.

As illustrated in FIG. 1A, the outer layer (1) of the elbows comprises a plurality of segments 8 for forming the curved segment 8B from the preceding segment, or incoming segment entering the elbow, to the subsequent segment, or outgoing segment exiting the elbow.

In a second embodiment of the invention, a kit is previously prepared so that the operations to be performed in the field are simplified. With the second embodiment of the invention, the components of the kit are ready to be placed directly and in a single operation on the facility of the conduits. The kit supplied for being installed in the field already has the insulation layer or intermediate layer (2) and the encasement layer or outer layer (1) integrated in its components. With this arrangement, the assembly of the insulation and encasement system is simplified as only the components already incorporating the intermediate layer (2) and the outer layer (1) have to be assembled on the conduits.

As illustrated in FIG. 1B, the outer layer (1) of the elbows comprises a right angle shape for forming the change of direction segment 8B from the preceding segment, or incoming segment entering the elbow, to the subsequent segment, or outgoing segment exiting the elbow. Therefore, in the embodiment of the kit the elbows are formed by two halves at a right angle from the preceding segment, or incoming segment entering the elbow, to the subsequent segment, or outgoing segment exiting the elbow. The number of parts needed for forming an elbow is thus reduced.

The two halves are configured to contact in 2 diametrically opposed generatrices as illustrated in FIG. 5.

The encasement illustrated in FIG. 1B2 comprises an assembly rim (1000) at a front end configured to axially assemble a first encasement (1001) with a consecutive second encasement (1002).

Figure 2:
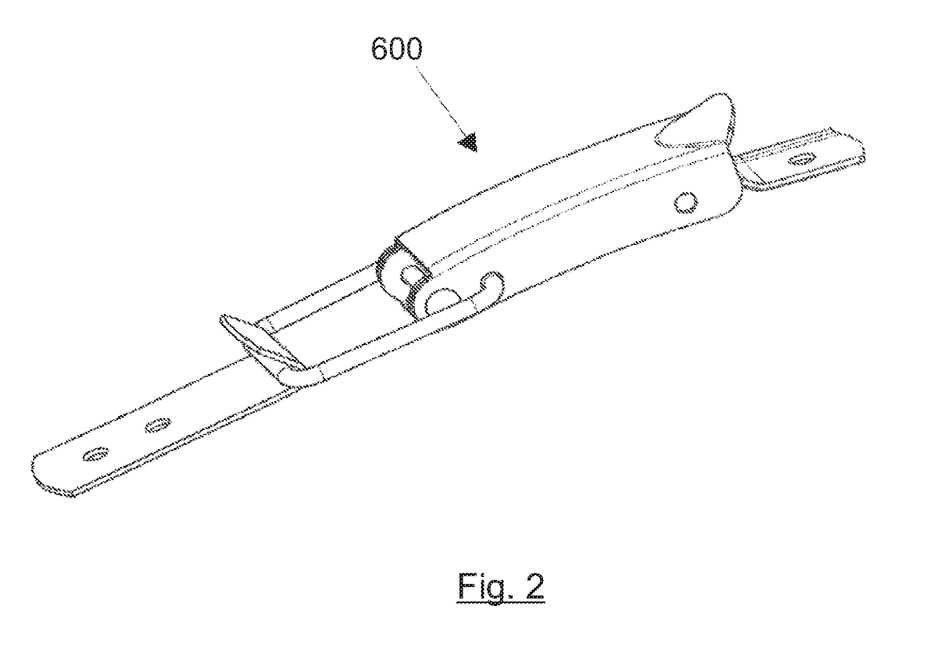
FIG. 2 shows a clamp-type closure.

The encasement comprises means for fixing and sealing the 2 halves:
  a circular metal flange (7) as illustrated in FIG. 1B2 configured to close and seal the assembly rims (1000);
  a joint (1001C) as illustrated in FIG. 5 configured to seal an attachment between the two halves (1001A, 1001B);
  perimetric closing means selected from a plurality of flanges with screw locking and a plurality of clamp-like quick-closures (600) as illustrated in FIG. 2 configured to allow assembling/disassembling the encasement.

The encasement illustrated in FIG. 5 comprises means for closing the 2 halves comprising:
  a longitudinal metal flange (1001D) configured to externally close the two halves (1001A, 1001B).

Figure 6A:
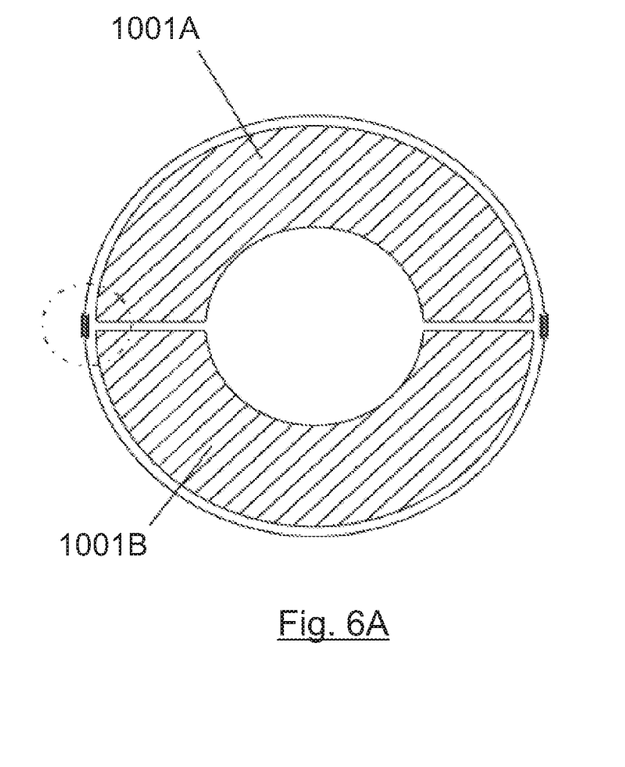
FIG. 6A is a cross-section showing two halves of an encasement, each half having a flange configured to house a longitudinal joint.
Figure 6B:
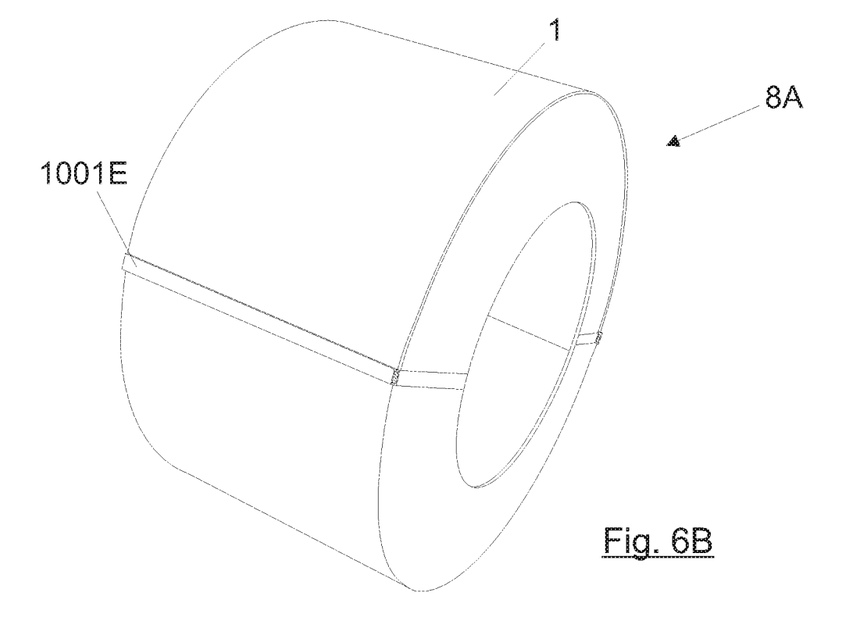
FIG. 6B is a perspective view of the encasement of the embodiment of FIG. 6A, showing a longitudinal metal flange 1001E.
Figure 7:
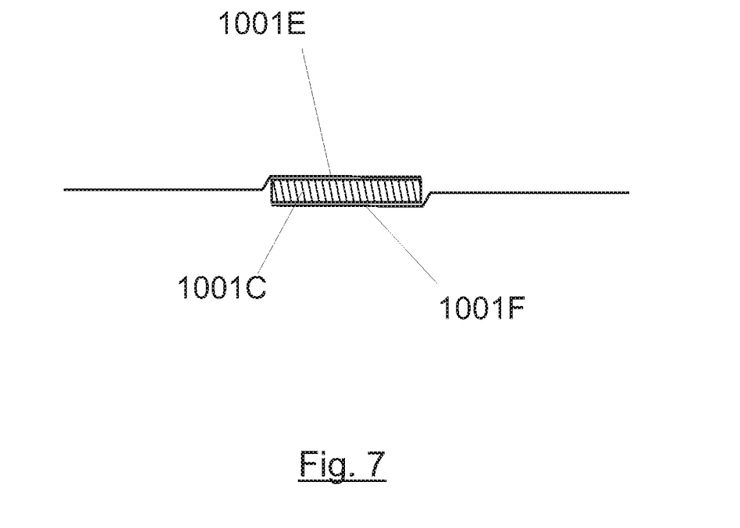
FIG. 7 shows a detail of the area of contact between the flange of each half and the longitudinal joint.

The encasement illustrated in FIGS. 6 and 7 comprises means for closing the 2 halves comprising:
  a first longitudinal metal flange (1001E) on a first half (1001A);
  a second longitudinal metal flange (1001F) on a second half (1001B);
  wherein the joint (1001C) is housed between the first longitudinal metal flange (1001E) and the second longitudinal metal flange (1001F).

Figure 4:
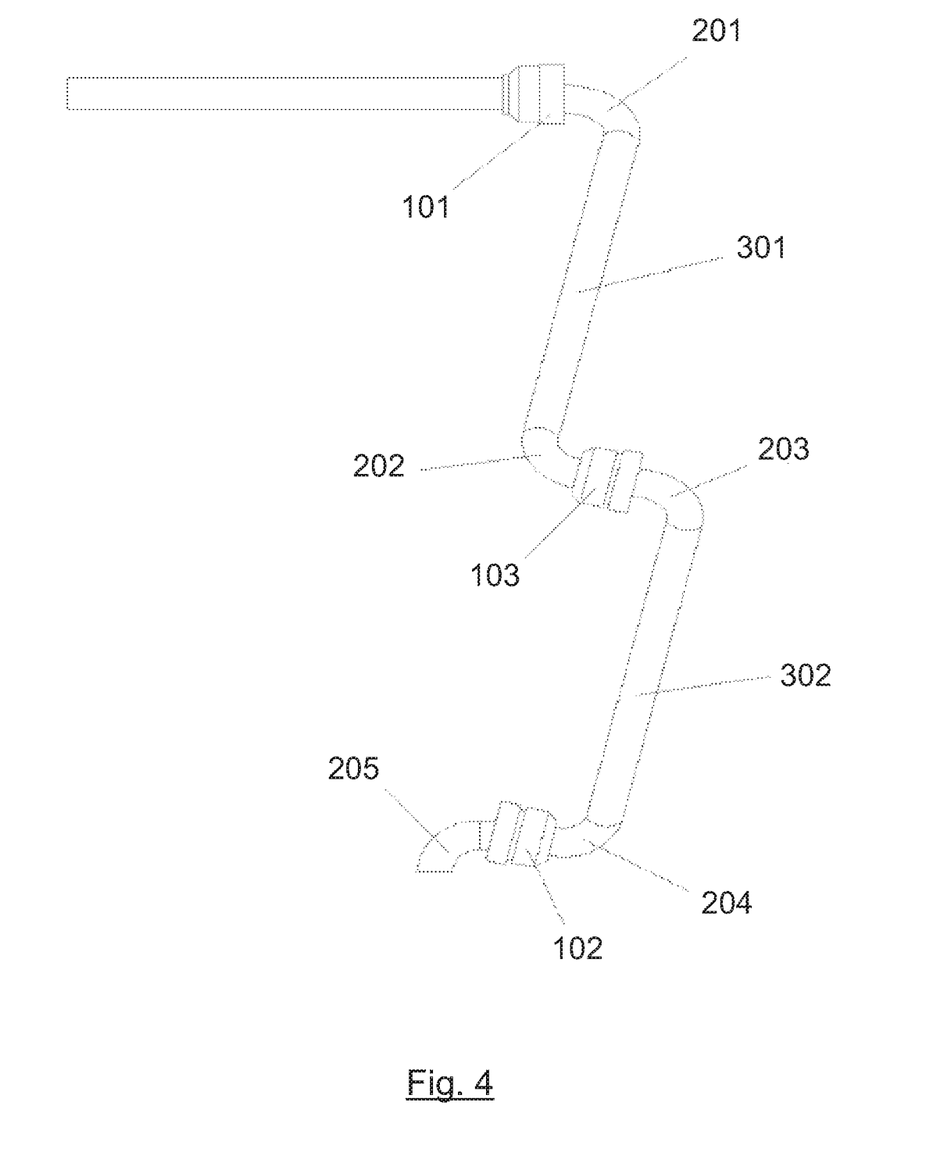
FIG. 4 shows a single arm.

Simple swivel arm as illustrated in FIG. 4 comprising:
  3 boxes according to previous features;
    a first entrance box (101);
    a second exit box (102);
    a third intermediate box (103);
  5 elbows according to previous feature;
    a first elbow (201) exiting the entrance box (101);
    442) a second elbow (202) entering the intermediate box (103);
    a third elbow (203) exiting the intermediate box (103);
    a fourth elbow (204) entering the exit box (102);
    a fifth elbow (205) exiting the exit box (102);
  2 straight segments according to previous feature;
    a first incoming segment (301) between the entrance box (101) and the intermediate box (103);
    a second outgoing segment (302) between the intermediate box (103) and the exit box (102).

Figure 3:
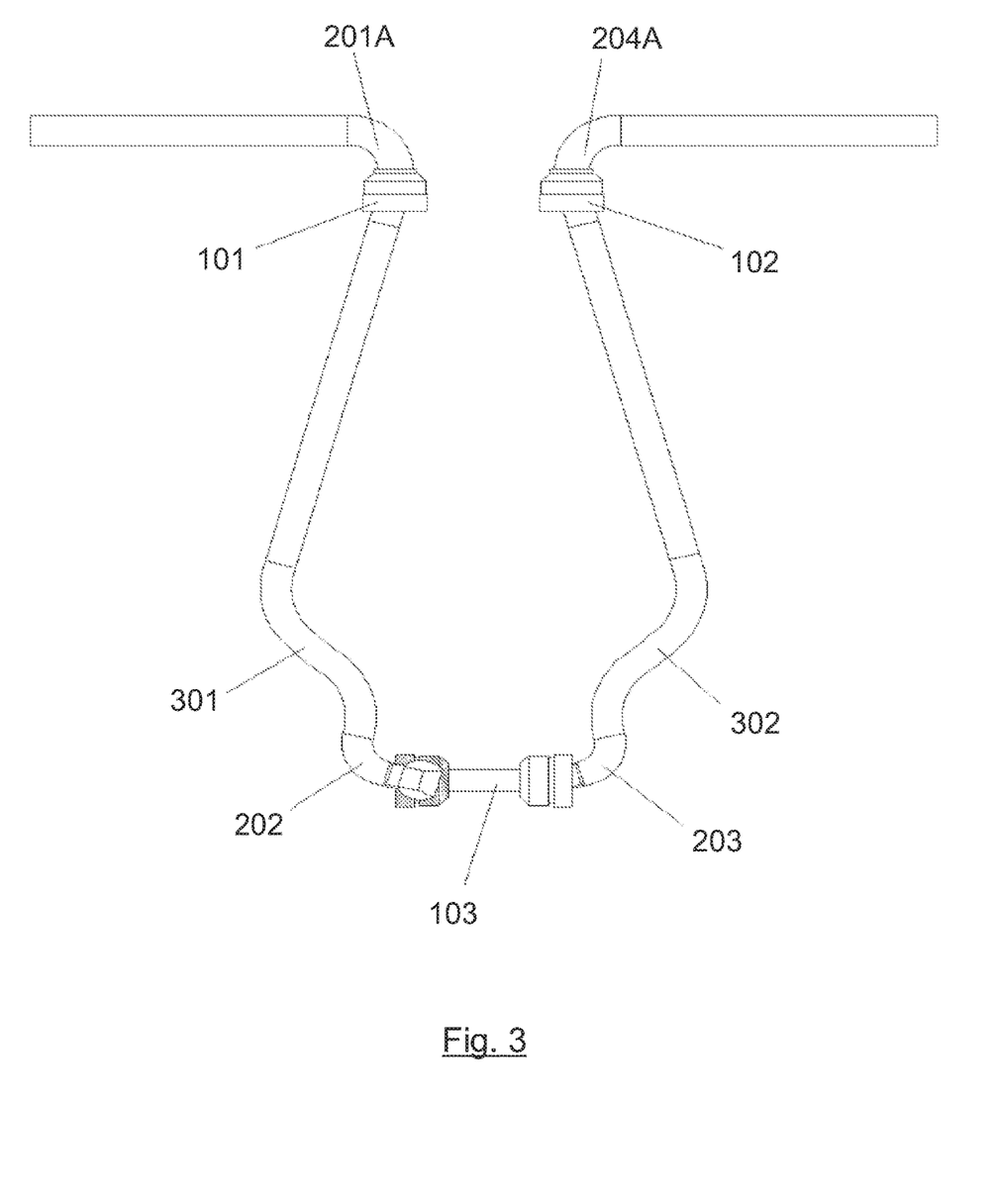
FIG. 3 shows a double arm.

Swivel arm configured as illustrated in FIG. 3 comprising:
  3 boxes according to previous features;
    a first entrance box (101);
    a second exit box (102);
    a third intermediate box (103);
  4 elbows according to previous feature;
    a first elbow (201A) entering the entrance box (101);
    a second elbow (202) entering the intermediate box (103);
    a third elbow (203) exiting the intermediate box (103);
    a fourth elbow (204A) exiting the exit box (102);
  2 z-shaped segments according to previous feature;
    a first incoming segment (301) between the entrance box (101) and the intermediate box (103);
    a second outgoing segment (302) between the intermediate box (103) and the exit box (102).

The invention claimed is:

1. An encasement for movable heat transfer fluid conduits, comprising:
  a first cylindrical encasement segment comprising:
    a box adapted to envelop a rotating joint of a heat transfer fluid conduit and to absorb rotational movement of the rotating joint; and
    a first assembly flange; and
  a second cylindrical encasement segment adapted to envelop a section of the heat transfer fluid conduit, the section being connected to the rotating joint, the second cylindrical encasement section comprising:

a second assembly flange;

each of the first cylindrical encasement segment and the second cylindrical encasement segment comprising:

an outer layer comprising sheet metal; and an intermediate layer located below the outer layer, said intermediate layer being made of insulating material having a maximum thickness of 1.4 inches;

wherein:

the first cylindrical encasement segment is adapted to be coupled to the second cylindrical encasement segment; and the first and second assembly flanges are adapted to axially connect the first cylindrical encasement to the second cylindrical encasement segment and provide clearance between the box of the first cylindrical encasement segment and the second cylindrical encasement segment.

2. The encasement according to claim 1, the first cylindrical encasement segment comprising first and second halves configured to envelop the rotating joint of the heat transfer fluid conduit and to fit together.

3. The encasement according to claim 2, wherein the first and second halves are configured to contact in two diametrically opposed generatrices.

4. The encasement according to claim 2, further comprising:

a joint configured to seal an attachment between the first and second halves.

5. The encasement according to claim 2, further comprising at least one longitudinal metal flange configured to close the first and second halves.

6. The encasement according to claim 5, further comprising wherein:

the at least one longitudinal metal flange includes a first longitudinal metal flange and a second longitudinal metal flange;

the first longitudinal metal flange is disposed on the first half;

the second longitudinal metal flange is disposed on the second half; and a joint is housed between the first longitudinal metal flange and the second longitudinal metal flange.

7. The encasement according to claim 5, wherein the at least one longitudinal metal flange has a height between 0.4 and 0.6 inches.

8. The encasement according to claim 7, further comprising a cover, wherein the cover comprises aluminum sheet metal having a thickness between 0.015 and 0.04 inches thick aluminum sheet metal.

9. The encasement according to claim 7, further comprising a cover comprising:

a glass fiber fabric having a thickness between 0.004 and 0.06 inches; and a sheet made of corrosion resistant material having a thickness between 0.004 and 0.06 inches.

10. The encasement according to claim 9, wherein the sheet comprises aluminum.

11. The encasement according to claim 10, wherein the sheet has a thickness between 0.012 and 0.016 inches.

12. The encasement according to claim 11, wherein the insulating material is microporous.

13. The encasement according to claim 12, wherein the insulating material is configured to heat-insulate and has a heat transfer coefficient between 0.11 and 0.33 BTUin/($hrft^2F$) at 752° F. of the temperature of a heat transfer fluid.

14. The encasement according to claim 13, further comprising:

an inner layer comprising:

a second glass fiber fabric having a thickness between 0.004 and 0.06 inches; and a second sheet made of corrosion resistant material having a thickness between 0.004 and 0.06 inches.

* * * * *